United States Patent
Hecht

(10) Patent No.: US 8,573,905 B2
(45) Date of Patent: Nov. 5, 2013

(54) TRIANGULAR CUTTING INSERT AND CUTTING TOOL

(75) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 14 days.

(21) Appl. No.: 13/427,586

(22) Filed: Mar. 22, 2012

(65) Prior Publication Data

US 2013/0251464 A1  Sep. 26, 2013

(51) Int. Cl.
*B23B 27/22* (2006.01)
*B23C 5/02* (2006.01)

(52) U.S. Cl.
USPC ............................................. 407/113; 407/114

(58) Field of Classification Search
USPC .................. 407/113, 114, 115, 116; D15/139
See application file for complete search history.

(56) References Cited

U.S. PATENT DOCUMENTS

| | | | | |
|---|---|---|---|---|
| 4,318,644 A * | 3/1982 | Seidel | ............................ | 407/114 |
| 5,044,840 A * | 9/1991 | Fouquer et al. | ............... | 407/114 |
| 6,146,065 A * | 11/2000 | Isaksson | ........................ | 407/114 |
| 7,494,303 B2 * | 2/2009 | Koskinen | ...................... | 407/113 |
| 7,604,441 B2 | 10/2009 | Bhagath | | |
| 7,909,546 B2 * | 3/2011 | Nada et al. | ...................... | 407/114 |
| 8,459,162 B2 * | 6/2013 | Kimura et al. | ................... | 83/835 |

| | | | |
|---|---|---|---|
| 2007/0071559 A1 | 3/2007 | Koskinen | |
| 2008/0044241 A1 * | 2/2008 | Koskinen | ....................... 407/103 |
| 2013/0004251 A1 | 1/2013 | Hausmann et al. | |

FOREIGN PATENT DOCUMENTS

| | | |
|---|---|---|
| EP | 0342689 A2 | 11/1989 |
| KR | 100939085 B1 | 1/2010 |
| WO | 2010/127743 | 11/2010 |
| WO | 2010/137762 | 12/2010 |

OTHER PUBLICATIONS

International Search Report dated Jul. 24, 2013 issued in PCT counterpart application (No. PCT/IL2013/050165).

* cited by examiner

*Primary Examiner* — Will Fridie, Jr.
(74) *Attorney, Agent, or Firm* — Womble Carlyle

(57) ABSTRACT

A triangular cutting insert has first and second surfaces, a midplane, a peripheral surface, with an insert center axis. The peripheral surface has alternating relief flanks and corners. A major cutting edge formed between each relief flank and the first and second surfaces, connects at a corner to a wiper edge included in a bounding plane of the insert. The wiper edge further connects to a transitional slope directed toward the midplane and an adjacent major cutting edge. Viewed along the insert center axis, an insert footprint is symmetrical to each corner bisector, and each major cutting edge is perpendicular to the associated secondary slope. Viewed perpendicular to the bisector, the relief flank is in a peripheral plane, and the transitional slope is between the peripheral plane and the insert center axis. Viewed along the corner bisector, each visible major cutting edge forms a first angle with the bounding plane.

20 Claims, 4 Drawing Sheets

TRIANGULAR CUTTING INSERT AND CUTTING TOOL

FIELD OF THE INVENTION

The present invention relates to rotary metal cutting tools and cutting inserts, for metal cutting processes in general, and to indexable reversible cutting inserts for square shoulder milling operations, in particular.

BACKGROUND OF THE INVENTION

Metal cutting tools used in milling operations, including cutting inserts which are removably secured in a cutting body, have long since provided a suitably hard material, i.e. cemented carbide, in the vicinity of the cutting edge, where the cutting body, manufactured from a less hard material, is reusable following the disposal of a worn or damaged cutting insert.

Cutting inserts are clamped within insert receiving pockets located on the periphery of the tool body, for holding and supporting cutting inserts in both axial and radial directions during operation (e.g., milling operation). Cutting inserts may be indexed and further turned over before being placed again in the insert receiving pocket, for employing unused cutting edges. Examples of such cutting inserts are disclosed in the following publications: U.S. Pat. No. 7,604,441, U.S. Pat. No. 4,318,644, WO2010/137762A1 and WO2010/127743A1.

It is an object of the subject matter of the present application to provide an improved and novel indexable reversible triangular cutting insert having a total of six cutting edges, in particular to be employed in square shoulder milling.

SUMMARY OF THE INVENTION

In accordance with the subject matter of the present application, there is provided a reversible indexable triangular cutting insert, comprising:
  first and second parallel bounding planes between which the cutting insert is located, and a midplane extending parallel to, and located midway between, the bounding planes, with an insert center axis, passing through the insert triangle geometric center and extending perpendicular to the midplane;
  a first surface and a second surface, each of the first and second surfaces including at least one insert abutment portion;
  a bore passing through, and opening out to at least one of the first and second surfaces;
  a peripheral surface extending between the first and second surfaces, the peripheral surface including three peripheral relief flanks alternating with three peripheral corners, the peripheral surface intersecting with each of the first and second surface, at an insert edge, each insert edge including three edge portions, each edge portion comprising:
    a major cutting edge, formed at the intersection of each peripheral relief flank with one of the first and second surfaces;
    a wiper corner, coupled with the major cutting edge, the wiper corner having a bisector bisecting the wiper corner and intersecting with the insert center axis; and
    a transitional slope coupled with, and extending from, the wiper corner towards the midplane;
  each wiper corner further comprises:
    a wiper portion, coupled with the associated major cutting edge, the wiper portion included in an associated bounding plane; and
    a secondary slope extending between the wiper portion and the transitional slope, in the direction of the midplane;
  wherein:
    viewed along the insert center axis, a footprint of the insert exhibits mirror symmetry relative to each one of the bisectors, and the contour of each major cutting edge is substantially perpendicular to the contour of the associated secondary slope,
    viewed perpendicular to one of the bisectors in a side view, the peripheral relief flank perpendicular to that bisector is located in an insert peripheral plane, and the transitional slope coupled with the peripheral relief flank is located between the insert peripheral plane and the insert center axis, and
    viewed along one of the bisectors in a front view, each of the major cutting edges adjacent to that bisector forms a first angle with the associated bounding plane.

In accordance with another embodiment of the present invention, there is provided a cutting tool having a longitudinal axis of rotation, the cutting tool comprising:
  a tool body having at least one insert receiving pocket formed in a front end of the tool body; and
  a cutting insert as described above retained in the at least one insert receiving pocket.
In the cutting tool:
  the cutting tool body has a substantially cylindrical circumferential wall extending in a constant radius relative to the cutting tool longitudinal axis of rotation, the at least one insert receiving pocket opening out to the circumferential wall along a pocket first edge;
  the at least one insert receiving pocket comprises:
    a pocket abutment surface included in a pocket abutment plane;
    a threaded bore opening out to the pocket abutment surface;
    a first pocket sidewall extending along the pocket abutment plane, from the pocket first edge towards the longitudinal axis of rotation, up to a pocket inner corner, and in a view perpendicular to the pocket abutment plane, the first pocket sidewall forms a 60° angle with the pocket first edge;
    a second pocket sidewall, extending from the pocket abutment plane and from the pocket inner corner, and in a view perpendicular to the pocket abutment plane, the second pocket sidewall forms a 60° angle with the first pocket sidewall;
    an outer groove opening out to, and extending substantially along at least a portion of the pocket first edge;
    an inner groove extending along at least a portion of the first pocket sidewall and opening out to the pocket inner corner;
  at least a portion of the insert abutment portion abuts the pocket abutment surface;
  at least a portion of each of two peripheral relief flanks of the cutting insert abuts a respective one of the first and second pocket sidewalls; and
  a clamping bolt passes through the bore of the cutting insert and threadingly engages the threaded bore of the insert receiving pocket

BRIEF DESCRIPTION OF THE FIGURES

For a better understanding of the present application and to show how the same may be carried out in practice, reference will now be made to the accompanying drawings, in which.

Figure 1:
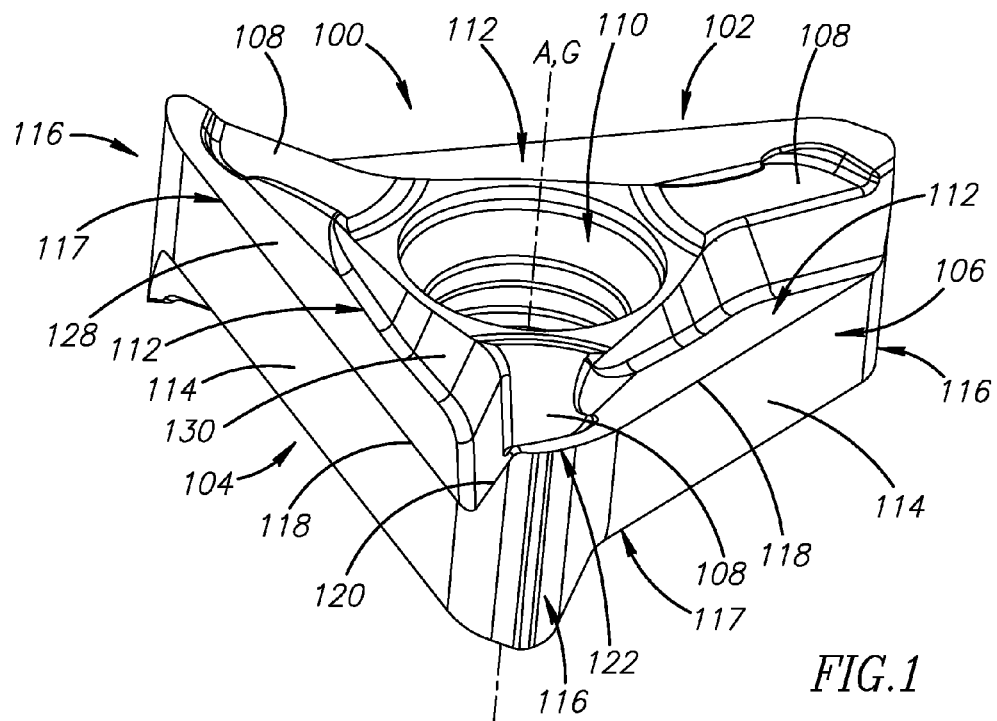
FIG. 1 is a perspective view of a cutting insert, in accordance with an embodiment of the disclosed technique.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the present invention. However, it will also be apparent to one skilled in the art that the subject matter of the present invention can be practiced without the specific configurations and details presented herein.

The present invention relates to a triangular indexable reversible cutting insert, having two opposing end surfaces and a peripheral surface extending therebetween, forming six major cutting edges. The invention also relates to a cutting tool for employing the cutting inserts in a positive axial rake angle and a positive radial rake angle when machining a work piece.

Attention is first drawn to FIGS. 1-6, depicting a cutting insert 100 of the triangular indexable reversible (i.e., "double-sided") type, in accordance with an embodiment of the present invention. The cutting insert 100 includes a first surface 102, a second surface 104, and a peripheral surface 106 extending there between. The entire cutting insert 100 lies between two parallel bounding planes P1, P2 and further has midplane M which is parallel to both bounding planes and equidistant therefrom. The insert has an insert center axis G passing through the geometric center of the insert equilateral triangle and perpendicular to the midplane M.

Each of the first and second surfaces 102, 104 includes at least one insert abutment portion 108. At least a portion of the insert abutment portion 108 of each of the first and second surfaces 102, 104, is located on an abutment plane $P_{A1}$, $P_{A2}$. In the figures, the abutment planes $P_{A1}$, $P_{A2}$ are seen to be parallel to each other, to the bounding planes P1, P2 and also to the midplane M. It is understood, however, that at least a portion of each insert abutment portion 108 may instead lie on a plane which is angled relative to the bounding planes P1, P2 and the midplane M.

The cutting insert 100 further includes a bore 110 located at the geometrical center of the cutting insert 100. The bore 110 may be a through bore which opens out to the first and second surfaces 102, 104. However, it is noted that the bore 110 may be a blind bore opening out to one of the first and second surfaces 102, 104 (for example, a blind bore adapted to receive a clamping element). Although not binding, in the following description, the bore 110 will be referred to as a through bore 110. The through bore 110 has a central bore axis A, extending there through. The central bore axis A may be perpendicular to the midplane M and to the bounding planes P1, P2, as depicted in the figures and discussed in the embodiments described herein. However, in some embodiments of the invention, the bore 110 may be formed such that the central bore axis A is inclined relative to the midplane M and to the bounding planes P1, P2.

Figure 4:
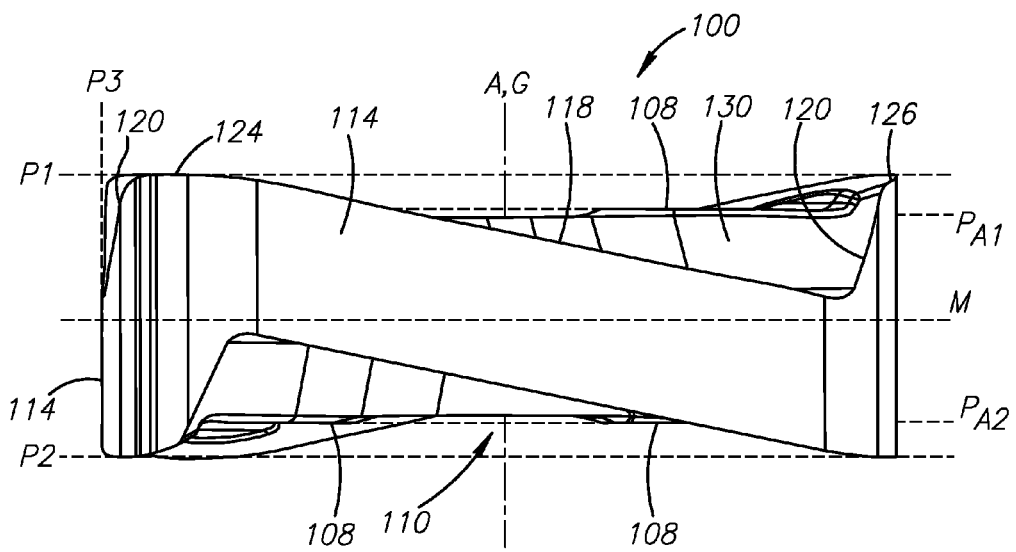
FIG. 4 is a side view of the cutting insert shown in FIG. 1, taken from the view IV-IV.

It should be noted, that features of the cutting insert 100 are referred to as being "associated" with other features that are located on the same side of the midplane M. As indicated in FIG. 4, the bounding plane P1 and the abutment plane $P_{A1}$ are associated with the first surface 102, and the bounding plane P2 and the abutment plane $P_{A2}$ are associated with the second surface 104. The first and second surfaces 102, 104 are identical, and only one of them will be elaborated herein, with regard to certain aspects.

Figure 2:
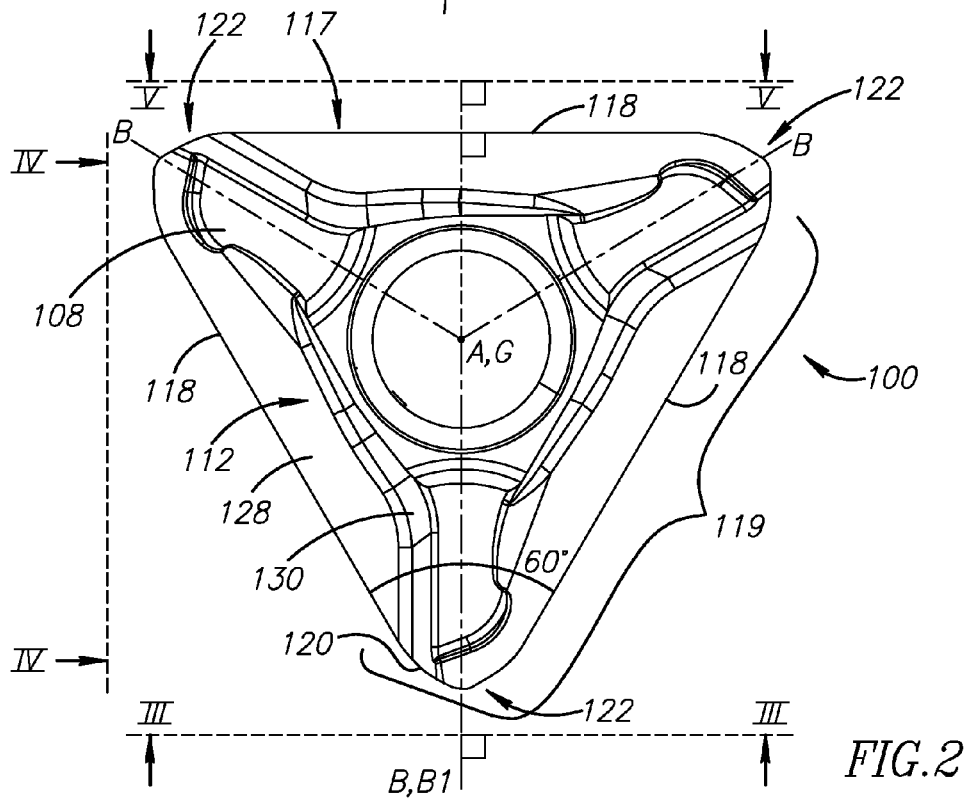
FIG. 2 is a top plan view of the cutting insert shown in FIG. 1.
Figure 6:
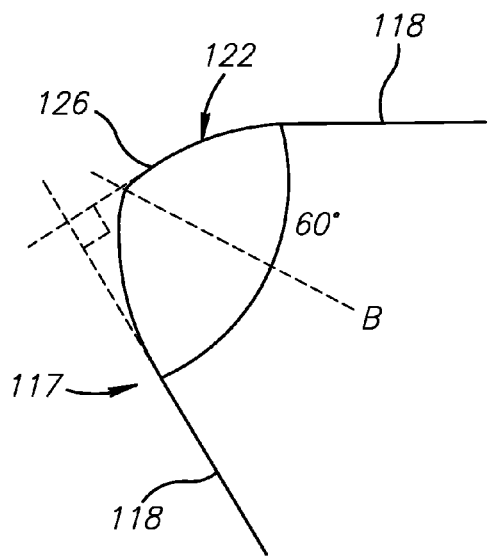
FIG. 6 is a detail view of the insert edge in a corner of the cutting insert shown in FIG. 1.

The peripheral surface 106 extends between the first and second surfaces 102, 104, perpendicular to the bounding planes P1, P2. The peripheral surface 106 includes three peripheral relief flanks 114, alternating with three peripheral corners 116. The peripheral surface 106 intersects with each one of the first and second surface 102, 104 in an insert edge 117. The insert edge 117 includes three edge portions 119, each edge portion 119 including a linear major cutting edge 118, formed at the intersection of each peripheral relief flank 114 with one of the first and second surfaces 102, 104. Each edge portion 119 further includes a wiper corner 122, coupled with the major cutting edge 118, and a transitional slope 120 coupled with, and extending from, the wiper corner 122 towards the midplane M. The wiper corner 122 has a bisector B. As best shown in FIGS. 2 and 6, the bisector B bisects the wiper corner 122, and is perpendicular to the opposite major cutting edge 118. If the central bore axis A is perpendicular to the midplane M and the bounding planes P1, P2, the bisector B also intersects with the central bore axis A. The cutting insert 100 has a general shape of an equilateral triangle. Thus, a 60° angle is formed between the sides thereof, i.e., between each pair of peripheral relief flanks 114. In the top plan view of the cutting insert 100, shown in FIG. 2, a 60° angle is formed between each pair of major cutting edge 118. Thus, the bisector B bisects the 60° angle formed between the major cutting edges 118.

The first surface 102 further includes three beveled rake portions 112. Each beveled rake portion 112 includes an outer wall 128 and an inner wall 130. The outer wall 128 intersects with the insert edge 117, such that it extends along an associated major cutting edge 118 and at least a portion of an associated wiper corner 122. The outer wall 128 extends along the associated major cutting edge 118 and at least a portion of the adjacent wiper corner 122, and sloping towards the midplane M and the through bore 110. The inner wall 130 extends from the outer wall 128 in a non-coplanar manner, towards the associated abutment plane $P_{A1}$, $P_{A2}$, and the through bore 110.

With reference to FIG. 2, the cutting insert 100 is shown in a top plan view, perpendicular to the bounding plane P1. In this view, each bisector B is shown to bisect the associated wiper corner 122, and extend towards the insert center axis G, perpendicular to the opposite major cutting edge 118. Further, in the top plan view, the insert edge 117 is shown to exhibit 120° rotational symmetry about the insert center axis G, and the footprint of the cutting insert 100 is shown to exhibit mirror symmetry relative to each one of the bisectors B. If the central bore axis A is perpendicular to the midplane M, the central bore axis A coincides with the insert center axis G, as shown in the figures, and the cutting insert 100 exhibits 120° rotational symmetry also about the central bore axis A.

The views III-III, IV-IV and V-V, which are identified in FIG. 2, are all referred to with respect to a specific bisector B1 of bisectors B. However, it should be understood that this is done only for clarity reasons, and that due to the rotational symmetry of the cutting insert 100, the same views may be taken with respect to any one of the bisectors B.

Figure 3:
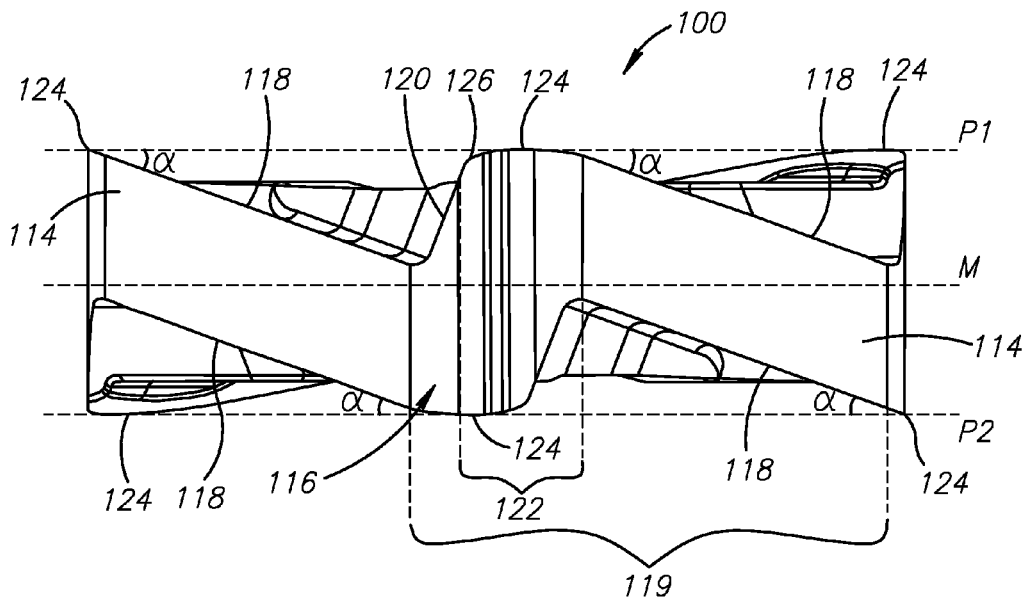
FIG. 3 is a front view of the cutting insert shown in FIG. 1, taken from the view III-III.

Further reference is now made to FIG. 3, depicting a front view of the cutting insert 100, taken from the view III-III, along the bisector B1 (as apparent from FIG. 2). Each wiper corner 122 includes a wiper portion 124 and a secondary slope 126, coupled with the wiper portion 124. The wiper portion 124 is also coupled with the associated major cutting edge 118. The wiper portion 124 is included in the bounding plane P1 (or bounding plane P2 associated with the second surface 104), which is parallel to the abutment planes $P_{A1}$, $P_{A2}$. Thus, in the insert 100, each bounding plane P1, P2 may be considered to be defined by the three associated three wiper portions 124. The secondary slope 126 extends between the wiper portion 124 and the transitional slope 120, of the same edge portion 119.

In the front view of the cutting insert 100, taken along the bisector B1, two peripheral flanks 114 are visible, i.e., the two peripheral flanks 114 adjacent to the peripheral corner 116 and the wiper corner 122 associated with the bisector B1. These two peripheral flanks 114 include a total of four visible major cutting edges 118. Each of these four visible major cutting edges 118 forms a first angle α with its associated bounding plane P1, P2. According to an embodiment of the disclosed technique, the first angle α may be in the range of 4°≤α≤40°. In particular, α may be a 20° angle.

Further reference is now made to FIG. 4, depicting a side view of the cutting insert 100, taken from the view IV-IV, perpendicular to the bisector B1 (as apparent from FIG. 2). In this side view, the peripheral relief flank 114 perpendicular to that bisector B1 is located in an insert peripheral plane P3, being the outermost plane in this view. In particular, the transitional slope 120 coupled with this peripheral relief flank 114 is located between the insert peripheral plane P3 and the insert center axis G. In this manner, the transitional slope 120 does not operate against the machined work piece, while the major cutting edge 118 and the wiper corner 122 are in contact with the work piece. In other words, the transitional slope 120 is kept away from contacting the work piece, and as such, the transitional slope 120 does not operate as a cutting edge, when the cutting insert 100 is employed in machining operations.

Figure 5:
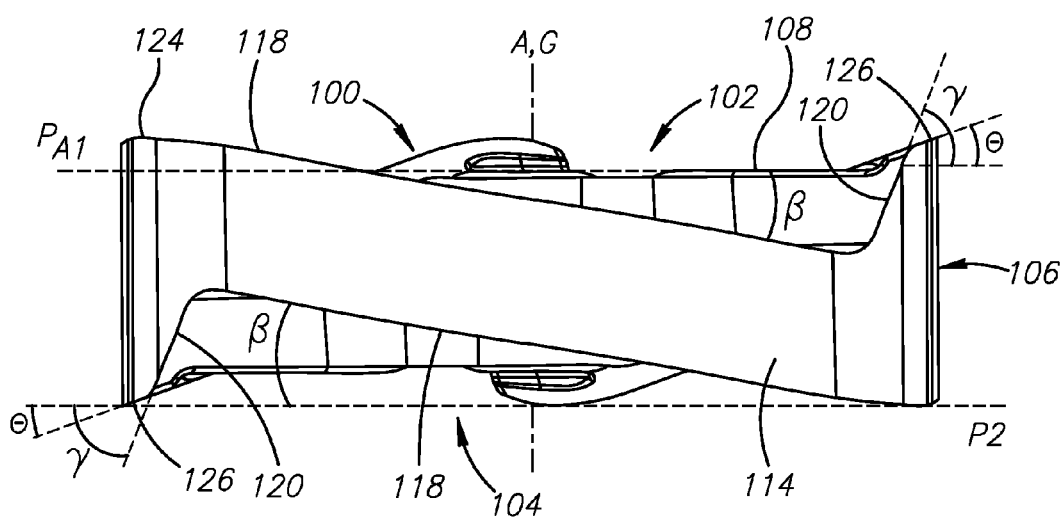
FIG. 5 is a rear view of the cutting insert shown in FIG. 1, taken from the view V-V.

Further reference is now made to FIG. 5, depicting a rear view of the cutting insert 100, taken from the view V-V, along the bisector B1 (as apparent from FIG. 2). In this rear view, on the second insert surface 104 side, the major cutting edge 118 of the peripheral relief flank 114 perpendicular to the bisector B1, forms a second angle β with the associated second bounding plane P2. Further, the transitional slope 120, coupled with this major cutting edge 118, forms a third angle γ with the associated second bounding plane P2, and the secondary slope 126, coupled with this transitional slope 120, forms a fourth angle θ with the associated second bounding plane P2. And since the cutting insert is double-sided (i.e., reversible), these second, third and fourth angles β, γ, θ, respectively, are also formed with respect to the first bounding plane P1 on the first insert surface 102 side. Furthermore, since in the figures, the abutment planes $P_{A1}$, $P_{A2}$ are shown to be parallel to the first and second bounding planes P1, P2, these second, third and fourth angles β, γ, θ, respectively, are also formed with respect to the abutment planes $P_{A1}$, $P_{A2}$.

According to some embodiments of the disclosed technique, the third angle γ may be in the range of 30°≤γ≤80°. In particular, the third angle γ may be a 66° angle. The fourth angle θ may be in the range of 5°≤θ≤40°. In particular, the fourth angle θ may be a 20° angle. In a preferred embodiment, the third angle γ is greater than the fourth angle θ.

Referring in particular to FIG. 6, a detail top plan view of the cutting insert 100, taken along the insert center axis G, depicts the contour of the wiper corner 122, in particular. As shown in this detail plan view, the contour of the major cutting edge 118 is substantially perpendicular to the contour of the associated secondary slope 126, allowing milling of a 90° square shoulder on a work piece. Such 90° square shoulder milling would not be possible unless there was a 90° angle between the contour of the major cutting edge 118 and the contour of the associated secondary slope 126. This feature is an advantage for the present invention, by allowing square shoulder milling with a double sided triangular cutting insert with a total of six cutting edges.

Figures 7, 8, 9:
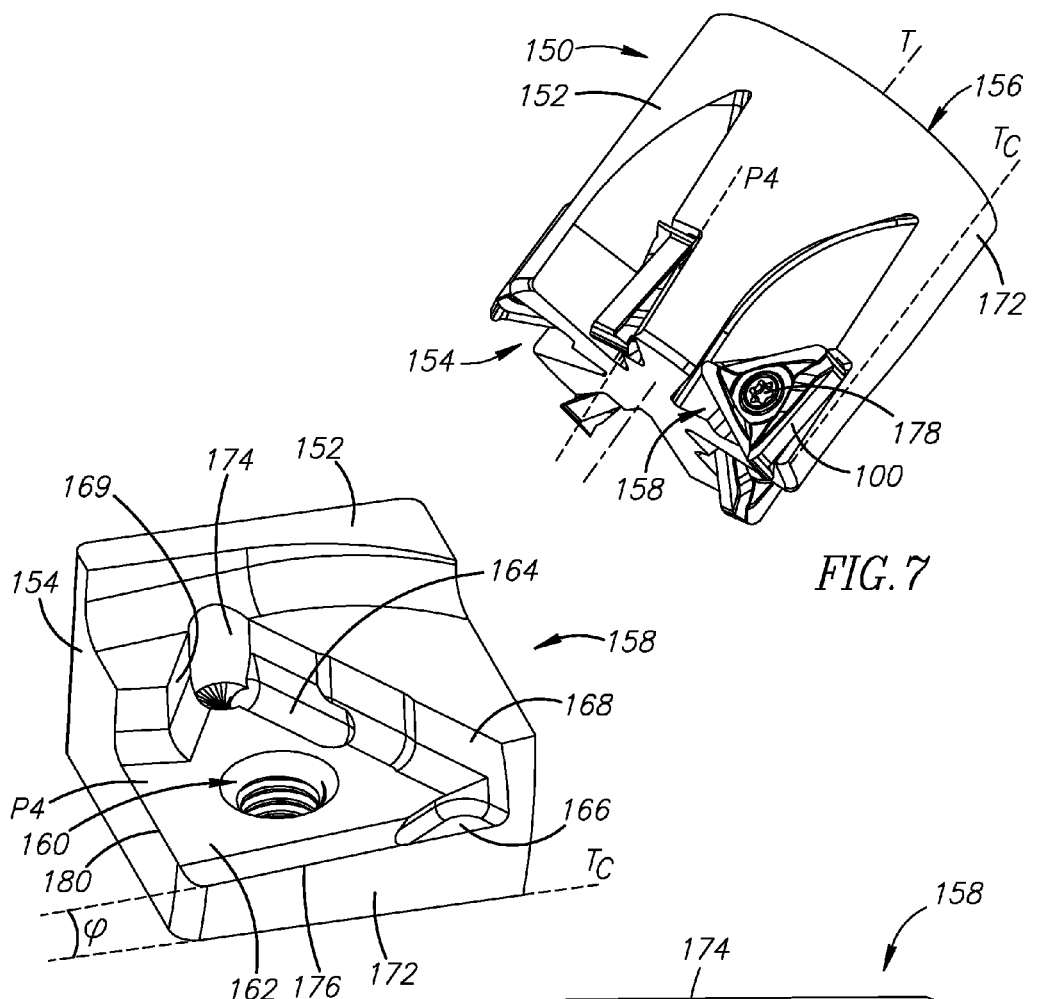
FIG. 7 is a perspective view of a cutting tool having cutting inserts as shown in FIG. 1 clamped in the insert receiving pockets thereof.
FIG. 8 is a perspective view of one of the insert pockets of the cutting tool shown in FIG. 7.
FIG. 9 is a plan view of the insert pocket shown in FIG. 8.

Reference is now made to FIG. 7, depicting a cutting tool 150 in accordance with another embodiment of the disclosed technique. The cutting tool 150 has a longitudinal axis of rotation T, and a tool body 152 having at least one insert receiving pocket 158 formed in a front end 154 thereof. The cutting tool 150 also includes a cutting insert 100 retained in the at least one insert receiving pocket 158. The tool body 152 has a substantially cylindrical circumferential wall 172 forming a constant radius (not shown) relative to the cutting tool longitudinal axis of rotation T. The at least one insert receiving pocket 158 opens out to the circumferential wall 172 along a pocket first edge 176. The at least one insert receiving pocket 158 opens out to the front end 154 of the tool body 152 along a pocket second edge 180.

Reference is further made to FIGS. 8-9, depicting a detail perspective and plan view of the insert receiving pocket 158, respectively. In accordance with some embodiments of the disclosed technique, each of the at least one insert receiving pocket 158 includes a pocket abutment surface 162, a threaded bore 160, a first pocket sidewall 168, a second pocket sidewall 169, an inner groove 164 and an outer groove 166. The threaded bore 160 opens out to the pocket abutment surface 162. The pocket abutment surface 162 lies on a pocket abutment plane P4. The pocket first edge 176 lies on the circumferential wall 172 and is parallel to the pocket abutment plane P4.

The first pocket sidewall 168 extends from the pocket abutment plane P4, between the pocket first edge 176 and a pocket inner corner 174, towards the longitudinal axis of rotation T. In a plan view taken perpendicular to the pocket abutment plane P4 (as shown in FIG. 9), the first pocket sidewall 168 forms a 60° angle with the pocket first edge 176. The second pocket sidewall 169 extends from the pocket abutment plane P4, emerging from the pocket inner corner 174. In the view taken perpendicular to the pocket abutment plane P4, the second pocket sidewall forms a 60° angle with the first pocket sidewall 168.

The outer groove 166 opens out to, and extends substantially along, at least a portion of the pocket first edge 176. The inner groove 164 extends along at least a portion of the first pocket sidewall 168, and opens out to the pocket inner corner 174.

When the cutting insert 100 is clamped within the insert receiving pocket 158, at least a portion of the insert abutment portion 108 abuts the pocket abutment surface 162. Further, at least a portion of each of two peripheral relief flanks 114 of the cutting insert 100 abut a respective one of the first and second pocket sidewalls 168, 169. One of the non-operative wiper corners 122 of the cutting insert 100 is located within the outer groove 166, while another one of the non-operative wiper corners 122 is located within the pocket inner corner 174, and a portion of the associated major cutting edge 118 is located within the inner groove 164.

Furthermore, a clamping bolt 178 passes through the through bore 110 of the cutting insert 100 and threadingly engages the threaded bore 160 of the insert receiving pocket 158, in order to resiliently hold the cutting insert 100 in place during operation.

As indicated in FIGS. 7 and 8, a circumferential longitudinal axis $T_C$, extends on the circumferential wall 172, parallel to the longitudinal axis of rotation T. In accordance with some embodiments of the disclosed technique, the pocket first edge 176 forms a fifth angle φ with the circumferential longitudinal axis $T_C$. Thus, the pocket abutment plane P4 is tilted by a tilt angle similar to the fifth angle φ, relative to the circumferential longitudinal axis $T_C$. When the cutting insert 100 is placed within the insert receiving pocket 158, the abutment planes $P_{A1}$, $P_{A2}$ of the cutting insert 100 assume the same orientation as of the pocket abutment plane P4. When the abutment planes $P_{A1}$, $P_{A2}$ assume a tilted orientation of the fifth angle φ relative to the circumferential longitudinal axis $T_C$, a similar relief angle is provided to the peripheral corner 116, which is located adjacent to the machined work piece (not shown). Thereby a relief clearance is achieved for the cutting insert 100 during operation, minimizing contact between the cutting insert 100 and the work piece.

In this configuration, the cutting insert 100 can be considered to be positioned in a "negative" axial position when considering the abutment surfaces $P_{A1}$, $P_{A2}$ relative to the front end 154 of the cutting tool body 152. However, since the major cutting edge 118 is inclined with regard to the abutment surfaces $P_{A1}$, $P_{A2}$ by the second angle β (FIG. 5), and since the second angle β is preferably greater than the fifth angle φ (β>φ), the major cutting edge 118 is positioned in a "positive" axial position relative to the work piece, which may lead to more effective machining. According to some embodiments of the disclosed technique, the fifth angle φ may be in the range of 0<φ≤15°, and the second angle β may be in the range of 2°≤β≤20°. In particular, the second angle β may be a 10° angle, and the fifth angle φ may be a 5° angle.

In accordance with some embodiments of the disclosed technique, the pocket second edge 180 is tilted by a positive radial rake angle (not shown) relative to a radial line (not shown) extending on the front end 154, between the longitudinal rotation axis T and the major cutting edge 118. In this position, the cutting insert 100 seated within the insert receiving pocket 158, is considered to be in a "positive" radial rake position, which may further enhance effective machining.

Although the present invention has been described to a certain degree of particularity, it should be understood that various alterations and modifications could be made without departing from the spirit or scope of the invention as hereinafter claimed.

What is claimed is:

1. A reversible indexable triangular cutting insert (100), comprising:
    first and second parallel bounding planes (P1, P2) between which the cutting insert is located, and a midplane (M) extending parallel to, and located midway between, the bounding planes (P1, P2), with an insert center axis (G) passing through the insert triangle geometric center and extending perpendicular to the midplane (M);
    a first surface (102) and a second surface (104), each of the first and second surfaces (102, 104) including at least one insert abutment portion (108);
    a bore (110) passing through, and opening out to at least one of the first and second surfaces (102, 104);
    a peripheral surface (106) extending between the first and second surfaces (102, 104), the peripheral surface (106) including three peripheral relief flanks (114) alternating with three peripheral corners (116), the peripheral surface (106) intersecting with each of the first and second surface (102, 104), at an insert edge (117), each insert edge (117) including three edge portions (119), each edge portion (119) comprising:
        a major cutting edge (118), formed at the intersection of each peripheral relief flank (114) with one of the first and second surfaces (102, 104);
        a wiper corner (122), coupled with the major cutting edge (118), the wiper corner (122) having a bisector (B, B1) bisecting the wiper corner (122) and intersecting with the insert center axis (G); and
        a transitional slope (120) coupled with, and extending from, the wiper corner (122) towards the midplane (M);
    each wiper corner (122) further comprises:
        a wiper portion (124), coupled with the associated major cutting edge (118), the wiper portion (124) included in an associated bounding plane (P1, P2); and
        a secondary slope (126) extending between the wiper portion (124) and the transitional slope (120), in the direction of the midplane (M);
    wherein:
        viewed along the insert center axis (G) in a plan view, a footprint of the insert exhibits mirror symmetry relative to each one of the bisectors (B, B1), and the contour of each major cutting edge (118) is substantially perpendicular to the contour of the associated secondary slope (126),
        viewed perpendicular to one of the bisectors (B, B1) in a side view, the peripheral relief flank (114) perpendicular to that bisector (B, B1) is located in an insert peripheral plane (P3), and the transitional slope (120) coupled with that peripheral relief flank (114) is located between the insert peripheral plane (P3) and the insert center axis (G), and
        viewed along one of the bisectors (B, B1) in a front view, each of the major cutting edges (118) adjacent to that bisector (B, B1) forms a first angle (α) with the associated bounding plane (P1, P2).

2. The cutting insert (100) according to claim 1, wherein each of the first and second surfaces (102, 104) further includes three beveled rake portions (112), each beveled rake portion (112) further comprising:
    an outer wall (128), extending along the associated major cutting edge (118) and at least a portion of the wiper corner (122), and sloping towards the midplane (M) and the through bore (110); and
    an inner wall (130), extending from the outer wall (128) in a non-coplanar manner, towards the associated insert abutment portion (108) and the through bore (110).

3. The cutting insert (100) according to claim 1, wherein the first angle (α) is in the range of 4°≤α≤40°.

4. The cutting insert (100) according to claim 3, wherein the first angle (α) is a 20° angle.

5. The cutting insert (100) according to claim 1, wherein viewed along one of the bisectors (B, B1) in a rear view, each of the major cutting edges (118) of the peripheral relief flank (114) perpendicular to the bisector (B, B1), forms a second angle (β) with the associated bounding plane (P1, P2), each of the associated transitional slopes (120) forms a third angle (γ) with the associated bounding plane (P1, P2), and each of the secondary slopes (126) forms a fourth angle (θ) with the associated bounding plane (P1, P2).

6. The cutting insert (100) according to claim 5, wherein the second angle (β) is in the range of 2°≤β≤20°.

7. The cutting insert (100) according to claim 6, wherein the second angle (β) is a 10° angle.

8. The cutting insert (100) according to claim 5, wherein the third angle (γ) is in the range of 30°≤γ≤80°.

9. The cutting insert (100) according to claim 8, wherein the third angle (γ) is a 66° angle.

10. The cutting insert (100) according to claim 5, wherein the fourth angle (θ) is in the range of 5°≤θ≤40°.

11. The cutting insert (100) according to claim 10, wherein the fourth angle (θ) is a 20° angle.

12. The cutting insert (100) according to claim 1, wherein the bore (110) is a through bore having a central bore axis (A), and opening out to both the first and second surfaces (102, 104).

13. A cutting tool (150) having a longitudinal axis of rotation (T), the cutting tool (150) comprising:
a tool body (152) having at least one insert receiving pocket (158) formed in a front end (154) of the tool body (152); and
a cutting insert (100) in accordance with claim 1 retained in the at least one insert receiving pocket (158).

14. The cutting tool (150) of claim 13, wherein:
the cutting tool body (152) has a substantially cylindrical circumferential wall (172) extending in a constant radius relative to the cutting tool longitudinal axis of rotation (T), the at least one insert receiving pocket (158) opening out to the circumferential wall (172) along a pocket first edge (176);
the at least one insert receiving pocket (158) comprises:
a pocket abutment surface (162) included in a pocket abutment plane (P4);
a threaded bore (160) opening out to the pocket abutment surface (162);
a first pocket sidewall (168) extending along the pocket abutment plane (P4), from the pocket first edge (176) towards the longitudinal axis of rotation (T), up to a pocket inner corner (174), wherein in a view perpendicular to the pocket abutment plane (P4), the first pocket sidewall (168) forms a 60° angle with the pocket first edge (176);
a second pocket sidewall (169), extending from the pocket abutment plane (P4) and from the pocket inner corner (174), wherein in a view perpendicular to the pocket abutment plane (P4), the second pocket sidewall (169) forms a 60° angle with the first pocket sidewall (168);
an outer groove (166) opening out to, and extending substantially along at least a portion of the pocket first edge (176);
an inner groove (164) extending along at least a portion of the first pocket sidewall (168) and opening out to the pocket inner corner (174);
at least a portion of the insert abutment portion (108) abuts the pocket abutment surface (162);
at least a portion of each of two peripheral relief flanks (114) of the cutting insert (100) abut a respective one of the first and second pocket sidewalls (168, 169); and
a clamping bolt (178) passes through the bore (110) in the cutting insert (100) and threadingly engages the threaded bore (160) of the insert receiving pocket (158).

15. The cutting tool (150) of claim 14, wherein the pocket first edge (176) forms a fifth angle (φ) with a circumferential longitudinal axis ($T_C$), the circumferential longitudinal axis ($T_C$) lying on the circumferential wall (172) and being parallel to the longitudinal axis of rotation (T).

16. The cutting tool (150) of claim 15, wherein the fifth angle (φ) is in the range of 0<φ≤15°.

17. The cutting tool (150) of claim 16, wherein the fifth angle (φ) is a 5° angle.

18. The cutting tool (150) of claim 15, wherein the second angle (β) is greater than the fifth angle (φ).

19. The cutting tool (150) of claim 14, wherein:
one of the wiper corners (122) of the cutting insert (100) is located within the outer groove (166),
another one of the wiper corners (122) is located within the pocket inner corner (174), and
a portion of the associated major cutting edge (118) is located within the inner groove (164).

20. A cutting tool body (152) having a longitudinal axis of rotation (T) and comprising:
a substantially cylindrical circumferential wall (172) extending in a constant radius relative to the cutting tool longitudinal axis of rotation (T), and
a plurality of circumferentially spaced apart insert receiving pockets (158) formed in a front end (154) of the tool body (152), each insert receiving pocket (158) opening out to the circumferential wall (172) along a pocket first edge (176);
wherein each insert receiving pocket (158) comprises:
a pocket abutment surface (162) included in a pocket abutment plane (P4);
a threaded bore (160) opening out to the pocket abutment surface (162);
a first pocket sidewall (168) extending along the pocket abutment plane (P4), from the pocket first edge (176) towards the longitudinal axis of rotation (T), up to a pocket inner corner (174), wherein in a view perpendicular to the pocket abutment plane (P4), the first pocket sidewall (168) forms a 60° angle with the pocket first edge (176);
a second pocket sidewall (169), extending from the pocket abutment plane (P4) and from the pocket inner corner (174), wherein in a view perpendicular to the pocket abutment plane (P4), the second pocket sidewall (169) forms a 60° angle with the first pocket sidewall (168);
an outer groove (166) opening out to, and extending substantially along at least a portion of the pocket first edge (176); and
an inner groove (164) extending along at least a portion of the first pocket sidewall (168) and opening out to the pocket inner corner (174).

* * * * *